Patented Oct. 4, 1949

2,483,929

UNITED STATES PATENT OFFICE 2,483,929

CATALYTIC HYDROCARBON CONVERSION

James R. Owen, Bartlesville, Okla., assignor to Phillips Petroleum Company, a corporation of Delaware No Drawing. Application January 15, 1946,
Serial No. 641,416

6 Claims. (Cl. 260—680)

This invention relates to an improved catalyst for hydrocarbon conversion and more particularly to a catalyst especially adapted to changing the carbon-to-hydrogen ratio of $C_2$-$C_8$ hydrocarbons. This invention relates further to improved hydrogenation and dehydrogenation processes utilizing such catalysts.

Various types of hydrocarbons, particularly those in the $C_2$-$C_8$ range must frequently be dehydrogenated to produce more unsaturated materials suitable for various purposes in the chemical industry. Such reactions include dehydrogenation of butane to produce butenes, of butenes to produce butadiene, and of other paraffins to produce olefins, and other olefins to produce diolefins. Conversely, it is frequently desirable to effect hydrogenation of unsaturated materials to produce more saturated products, such as hydrogenation of aromatics to produce cycloaliphatics, and hydrogenation of fractions containing olefinic impurities to effect saturation thereof.

As catalysts for such reactions, refractory metal oxides and mixtures thereof, in various forms, have been used. Such catalysts include, for example, the alumina-containing gels, such as chromia-alumina, silica-alumina, etc. These catalysts, while quite effective, leave considerable room for improvement, as to length or degree of activity, efficiency, per-pass conversion rate, stability to regeneration, etc. Conventional alumina-containing catalysts appear to lose activity on regeneration due to the formation therein of alpha-alumina, an inactive form of aluminum oxide. This inactive form appears to occur as the result of being subjected to successive high temperatures, as in regeneration. This phenomenon appears to occur to an appreciable extent in chromia-alumina catalysts of the gel type such as are commonly used in dehydrogenation reactions.

Applicant has now discovered an improved gel-type catalysts which has an extremely high surface area per unit mass as well as an increased resistance to high temperatures. Applicant's novel catalyst compositions show much greater resistance to destruction of their amorphous gel structure and much less formation of alpha alumina than is the case with chromia alumina gel and other alumina-containing catalysts. Furthermore, these catalysts have a much higher surface area per unit of mass than chromia-alumina gel catalysts, as well as much higher efficiency and life. In accordance with applicant's invention, the advantages referred to are obtained by the inclusion within a gel type chromia-alumina catalysts, of a minor proportion of beryllium oxide.

It is, therefore, an object of the present invention to provide a novel catalyst particularly adapted for hydrogenation and dehydrogenation of hydrocarbons. It is a further object of the present invention to provide a novel catalyst for the dehydrogenation of paraffins and olefins, such catalyst having superior and lasting activity therefor and improved heat stability. It is a still further ojpect of the present invention to provide an improved process for dehydrogenation and hydrogenation utilizing the novel catalyst of my invention.

In accordance with the present invention mixed gels comprising beryllia, chromia, and alumina, in the desired proportions are provided. A preferred mode of preparation is by coprecipitating these oxides in gel form followed by further treatment in the manner described herein.

In general, the beryllium oxide and the chromium oxide are present in minor proportions: The preferred composition of the catalyst is: 5 to 20 weight per cent beryllium oxide; 5 to 40 weight per cent chromium oxide, calculated as $Cr_2O_3$; and the remainder aluminum oxide. Chromium oxide contents in the higher part of the specified range are preferred. In dehydrogenation activity, in persistence in such activity, and in heat stability, catalysts prepared in accordance with this invention are superior to those known to the art.

Although the catalysts of this invention may be prepared by any of several procedures known to the art, a preferred procedure is as follows:

Concentrated aqueous solutions of salts of the three metals are separately prepared. A convenient method of preparation comprises heating aluminum nitrate nonahydrate until the aluminum nitrate dissolves in the water of crystallization. A similar procedure may be used for chromium nitrate nonahydrate. Addition of some water is required when hydrated beryllium nitrate is used. In any case, it is preferred that the water added should not be substantially in excess of the amount necessary to dissolve the salt. From each of the salt solutions a hydrosol is then prepared by slow addition of an alkali, preferably concentrated ammonium hydroxide; the amount added is preferably about 70 per cent of the amount necessary for complete precipitation of the metal ion. The mixture is then digested to redissolve and/or peptize any temporary precipitate. The three hydrosols are then mixed and diluted, and sufficient dilute alkali is added to coprecipitate completely all three metal ions as a mixture of the hydrous oxides. The precipitate is separated from the liquid, gradually heated to about 500° C., and maintained at 500° C. for several hours. The oxide mixture is then ground and formed into pills and is ready for use as a catalyst.

Preparation and activity of catalysts in accordance with this invention are further illustrated by the following examples.

Example I

A coprecipitated gel catalyst was prepared to contain 5 weight per cent chromium oxide, 5 weight per cent beryllium oxide, and 90 weight per cent aluminum oxide, in the following manner:

An aluminum oxide hydrosol was prepared by dissolving 3980 grams of aluminum nitrate nonahydrate in its own water of crystallization, maintaining the solution at 80–90° C. in a water bath, slowly adding 1525 cc. (70 per cent of the stoichiometrically equivalent ammonia) of concentrated ammonia (28–29 per cent) and digesting for 1 hour to redissolve the precipitate formed initially. A chromium oxide hydrosol was prepared by dissolving 158 grams of chromium nitrate nonahydrate in its own water of crystallization, maintaining the solution at 80–90° C. in a water bath, slowly adding 110 cc. of concentrated ammonia water (28–29 per cent) and digesting 2 hours to redissolve the precipitate formed initially. A beryllium oxide hydrosol was prepared by dissolving 224 grams of beryllium nitrate trihydate in its own water of crystallization plus 500 cc. of additional water, maintaining the solution at 80–90° C. in a water bath, slowly adding 114 cc. (70 per cent of the stoichiometrically equivalent ammonia) of concentrated ammonia water (28–29 per cent), and digesting for 1 hour to redissolve the precipitate formed initially. The three hydrosols were mixed, diluted to about 21 liters with distilled water, and stirred for 2 hours to effect complete mixing. A total of 9500 cc. of 2.6 per cent ammonia was then added slowly over an 11-hour period to complete the precipitation. The precipitated gel was washed three times by decanting 10 to 11 liters of supernatant liquid, replacing the decanted liquid with fresh distilled water, stirring, and allowing the gel to settle again. The gel was separated from excess water by filtration through Büchner funnels, was dried 4 days at 150° F., and was heated in a vertical furnace from 30° C. to 500° C. in 7 hours and kept at 500° C. for 9 hours (in an oxidizing atmosphere) to decompose residual ammonium nitrate and to activate the catalyst. The thermally treated gel was ground in a ball mill to pass a 100-mesh screen, and was formed into cylindrical pills, 1/8 inch in diameter and 1/8 inch in length, for use.

When the above catalyst and a catalyst prepared in a similar manner, except that no beryllium oxide was present, were used for the dehydrogenation of normal butane, the following data were obtained:

| Catalyst | Single-pass conversion of normal butane, wt. per cent | Yield/pass of $nC_4H_8+C_4H_6$, wt. per cent | Efficiency, per cent |
| --- | --- | --- | --- |
| 5% $Cr_2O_3$—95% $Al_2O_3$ | 35.0 | 28.3 | 80.9 |
|  | 45.0 | 34.0 | 75.5 |
| 5% $Cr_2O_3$—90% $Al_2O_3$—5% BeO | 35.0 | 31.9 | 91.2 |
|  | 45.0 | 38.7 | 86.0 |

It can be seen that the beryllia-containing catalyst is a much more efficient dehydrogenation catalyst than is the chromia-alumina catalyst. Furthermore, after 32 days of alternate one-hour periods of dehydrogenation and revivification under identical conditions (750 butane space velocity and 1050° F. temperature) the following data were obtained:

| Catalyst | Productivity, lb. $nC_4H_8+C_4H_6$ per 100 lb. catalyst per hr. | Percentage of initial productivity |
| --- | --- | --- |
| 5% $Cr_2O_3$—95% $Al_2O_3$ | 30.6 | 59 |
| 5% $Cr_2O_3$—5% BeO—90% $Al_2O_3$ | 66.3 | 87 |

Furthermore, after heating portions of the two catalysts for 9 hours at 1050° C. (1922° F.), and testing them for butane dehydrogenation at 500 space velocity and 1100° F., the following data were obtained:

| Catalyst | Yield/pass of $nC_4H_8+C_4H_6$ wt. per cent |
| --- | --- |
| 5% $Cr_2O_3$—95% $Al_2O_3$ | 9.6 |
| 5% $Cr_2O_3$—5% BeO—90% $Al_2O_3$ | 22.4 |

Example II

A catalyst prepared in a manner similar to that described in Example I, but prepared to contain 40 weight per cent chromium oxide, 10 weight per cent beryllium oxide, and 50 weight per cent aluminum oxide was found by X-ray diffraction studies of samples heated at 1050° C. (1922° F.) for several periods of time, to show a much greater resistance to destruction of the amorphous gel structure than a catalyst prepared to contain 40 per cent chromia and 60 per cent alumina. There was much less alpha-alumina (inactive form) present in the former catalyst than in the latter after similar heat treatments.

Example III

A catalyst prepared in a manner similar to that described in Example I but prepared to contain 20 weight per cent chromium oxide, 20 weight per cent beryllium oxide, and 60 weight per cent aluminum oxide was found to have a surface area of 150 square meters per gram as compared with an area of 55 square meters per gram for a commercial dehydrogenation catalyst. The catalyst of Example II had a surface area of 174 square meters per gram.

In a similar manner, the catalyst compositions described herein are effective for the dehydrogenation of other paraffins such as ethane, propane, pentane, etc., as well as olefins including butenes, pentenes, etc., as well as for hydrogenation of unsaturated materials such as cracked gasoline fractions, and olefins such as iso-octene and the like. In dehydrogenating reactions, the temperatures used will ordinarily be in the range of 450–750° C., while in hydrogenation reactions the temperature will ordinarily be in the range of 200–400° C.

I claim:

1. A catalyst effective in changing the carbon-to-hydrogen ratio of hydrocarbons and consisting essentially of 5 to 40 weight per cent of chromium oxide, 5 to 20 weight per cent of beryllium oxide, and 40 to 90 weight per cent of aluminum oxide formed by separately dissolving salts of the respective metals in a quantity of water not substantially in excess of the amount necessary to dissolve the salt, slowly adding alkali in an amount insufficient to effect precipitation of the metal ion as the hydroxide but sufficient to form the hydrosol thereof, admixing the respective hydrosols, adding sufficient alkali to coprecipitate completely the respective metal ions as a mixture of the hydrous oxides, gradually heating said mixture to about 500° C., and maintaining said temperature for a period sufficient to effect substantially complete conversion to the metal oxides.

2. The catalyst of claim 1 formed by adding ammonium hydroxide as the precipitant.

3. A process for the dehydrogenation of a dehydrogenatable hydrocarbon which comprises subjecting the hydrocarbon to dehydrogenating conditions at an elevated temperature in the presence of a dehydrogenating catalyst comprising essentially 5 to 20 weight per cent beryllium oxide, 5 to 40 weight per cent chromium oxide, and 40 to 90 weight per cent aluminum oxide formed by separately dissolving salts of the respective metals in a quantity of water not substantially in excess of the amount necessary to dissolve the salt, slowly adding alkali in an amount insufficient to effect precipitation of the metal ion as the hydroxide but sufficient to form the hydrosol thereof, admixing the respective hydrosols, adding sufficient alkali to coprecipitate completely the respective metal ions as a mixture of the hydrous oxides, gradually heating said mixture to about 500° C., and maintaining said temperature for a period sufficient to effect substantially complete conversion to the metal oxides; and recovering a dehydrogenated hydrocarbon from the process.

4. A process for dehydrogenating an aliphatic hydrocarbon having from two to eight carbon atoms per molecule which comprises subjecting the hydrocarbon to dehydrogenating conditions at an elevated temperature in the presence of a dehydrogenating catalyst comprising essentially 5 to 20 weight per cent beryllium oxide, 5 to 40 weight per cent chromium oxide, and 40 to 90 weight per cent aluminum oxide formed by separately dissolving salts of the respective metals in a quantity of water not substantially in excess of the amount necessary to dissolve the salt, slowly adding alkali in an amount insufficient to effect precipitation of the metal ion as the hydroxide but sufficient to form the hydrosol thereof, admixing the respective hydrosols, adding sufficient alkali to coprecipitate the respective metal ions as a mixture of the hydrous oxides, gradually heating said mixture to about 500° C., and maintaining said temperature for a period sufficient to effect substantially complete conversion to the metal oxides; and recovering a dehydrogenated hydrocarbon from the process.

5. A process for dehydrogenating butane which comprises subjecting butane to dehydrogenating conditions at an elevated temperature in the presence of a dehydrogenating catalyst comprising essentially 5 to 20 weight per cent beryllium oxide, 5 to 40 weight per cent chromium oxide, and 40 to 90 weight per cent aluminum oxide formed by separately dissolving salts of the respective metals in a quantity of water not substantially in excess of the amount necessary to dissolve the salt, slowly adding alkali in an amount insufficient to effect precipitation of the metal ion as the hydroxide but sufficient to form the hydrosol thereof, admixing the respective hydrosols, adding sufficient alkali to coprecipitate the respective metal ions as a mixture of the hydrous oxides, gradually heating said mixture to about 500° C., and maintaining said temperature for a period sufficient to effect substantially complete conversion to the metal oxides; and recovering unsaturated $C_4$ hydrocarbon.

6. A process for dehydrogenating n-butane to form butenes which comprises contacting n-butane under dehydrogenating conditions including a temperature in the range of 450° to 750° C. with a catalyst comprising essentially 5 to 20 weight per cent beryllium oxide, 5 to 40 weight per cent chromium oxide, and 40 to 90 weight per cent aluminum oxide, said catalyst having been formed by separately dissolving salts of the respective metals in a quantity of water not substantially in excess of the amount necessary to dissolve the salt, slowly adding ammonium hydroxide in an amount insufficient to effect precipitation of the metal ion as the hydroxide but sufficient to form the hydrosol thereof, admixing the respective hydrosols, adding sufficient ammonium hydroxide to coprecipitate completely the respective metal ions as a mixture of the hydrous oxides, gradually heating said mixture to about 500° C., and maintaining said temperature for a period sufficient to effect complete conversion to the metal oxides; and recovering an effluent comprising butenes.

JAMES R. OWEN.

REFERENCES CITED

The following references are of record in the file of this patent:

UNITED STATES PATENTS

| Number | Name | Date |
| --- | --- | --- |
| 2,325,911 | Huffman | Aug. 3, 1943 |
| 2,342,247 | Burk | Feb. 22, 1944 |
| 2,354,892 | Thacker | Aug. 1, 1944 |
| 2,393,537 | Huffman | Jan. 22, 1946 |

FOREIGN PATENTS

| Number | Country | Date |
| --- | --- | --- |
| 392,954 | Great Britain | May 22, 1933 |